United States Patent [19]
Ishii

[11] Patent Number: 5,483,279
[45] Date of Patent: Jan. 9, 1996

[54] HIGH SENSITIVITY CAMERA DEVICE

[75] Inventor: Kenji Ishii, Tokyo, Japan

[73] Assignee: NEC Corporation, Tokyo, Japan

[21] Appl. No.: 405,954

[22] Filed: Mar. 17, 1995

[30] Foreign Application Priority Data

Mar. 17, 1994 [JP] Japan ..................... 6-047545

[51] Int. Cl.$^6$ ................................. H04N 5/228
[52] U.S. Cl. .................... 348/222; 348/231; 348/265
[58] Field of Search .................... 348/222, 231, 348/262, 265; 358/909.1; H04N 5/76, 9/09, 5/228

[56] References Cited

U.S. PATENT DOCUMENTS 5,303,049  4/1994  Ejima ..................... 348/231

*Primary Examiner*—James J. Groody
*Assistant Examiner*—Sherrie Hsia
*Attorney, Agent, or Firm*—Sughrue, Mion, Zinn, Macpeak & Seas

[57] ABSTRACT

A high sensitivity camera device is disclosed, in which two frame memories are assigned to a system which processes' picture signals from an image pickup element, the signals are written to the frame memories alternately as they are read, signals read from the two frame memories are multiplied respectively by coefficients K ($K \leq 1$) and ($1-K$), and the results of the multiplication are added in an adder to be output. In this processing, the coefficients are changed for every frame or field, a weighted sum is taken to form a new frame or field by varying the ratio of addition according to the relationship between the read intervals, and a continuously changing picture is obtained. By employing the present invention it is possible to eliminate unnatural appearance of the motion of the objects in the picture by the use of two frame memories and two arithmetic circuits for which the addition coefficients can be controlled, even in the case of aiming at achieving high sensitivity by carrying out charge storage over the period which is an integral multiple of one frame or one field.

6 Claims, 4 Drawing Sheets

HIGH SENSITIVITY CAMERA DEVICE

BACKGROUND OF THE INVENTION

1. Field of the Invention

The present invention relates to a camera device, and more particularly to a high sensitivity camera device which is made highly sensitive by extending the storage time of the image pickup element than in the conventional device.

2. Description of the Prior Art

FIG. 3 is an example of a prior art highly sensitivity camera device, which shows an RGB three chip type high sensitivity color camera device that uses charge coupled devices (referred to as CCDs hereinafter) as image pickup elements. In each of the RGB channels, a CCD 1 is a photoelectric conversion element which converts an optical information to an electrical signal. A picture signal processing circuit 2 is a signal processing circuit which performs a specific processing such as gamma correction in order to convert the output of the CCD 1 to a picture signal. A frame memory 12 stores the output of the picture signal processing circuit 2 by means of a control signal, sent from a control circuit 11, which is linked to a charge read timing of a read interval control circuit 8, and converts an intermittently output picture to a picture continuous over the entire field or entire frame by repeatedly outputting the same picture until the next charge read. The read interval control circuit 8 is a circuit which controls the time interval of read pulses for transferring the charge stored in a charge storage part of the CCD 1 to a transfer part.

During the normal image pickup, the signal charge stored in the charge storage part is transferred to the transfer part for every field or every frame. However, during the high sensitivity image pickup, the time interval of the read pulses is set to an integral multiple of the field or frame period using an internally or externally set control signal in order to realize high sensitivity by making an arrangement to store the signal charge for a longer time in the charge storage part. The memory control circuit 11 is a circuit for controlling the read or write of the frame memory 12 linked with the charge read timing. A synchronizing signal generating circuit 9 is a circuit which generates a synchronizing signal necessary for the picture signal processing circuit 2 and a timing signal necessary for the read interval control circuit 8 and the memory control circuit 11.

FIG. 4 is a diagram describing the operation during the high sensitivity image pickup for the constitution as shown in FIG. 3, and shows an example in which the signal charge in the CCD 1 is stored over two frame periods. In the figure, signal A stored in the charge storage part of the CCD 1 for two frame periods is output at the time $t_O$. The signal A output from the CCD 1 is sent through the picture signal processing circuit 2 and is stored in the frame memory 12. In the frame memory 12, the same picture A is output repeatedly over the two frame periods until the time $t_1$ at which the next signal B is read.

However, in the high sensitivity camera device according to the prior art, intermittent pictures are converted to a continuous picture in terms of a frame memory, so that the picture is changed only in every several fields or several frames, and there is a drawback in that the motion of an object in the picture is unnatural.

SUMMARY OF THE INVENTION

In the high sensitivity camera device according to this invention, in order to realize high sensitivity by storing a signal charge for a period longer than one frame or one field period as well as to convert intermittent pictures to a continuous picture, the following arrangement is provided. Namely, the pictures are changed for every field or every frame to avoid the unnatural appearance of the motion of the objects in the pictures by alternately recording the intermittent signals using two frame memories, and adding the picture signals from the two frame memories by changing the picture signals according to specified ratios in response to the charge read interval.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DESCRIPTION OF THE PREFERRED EMBODIMENT

Figure 1:
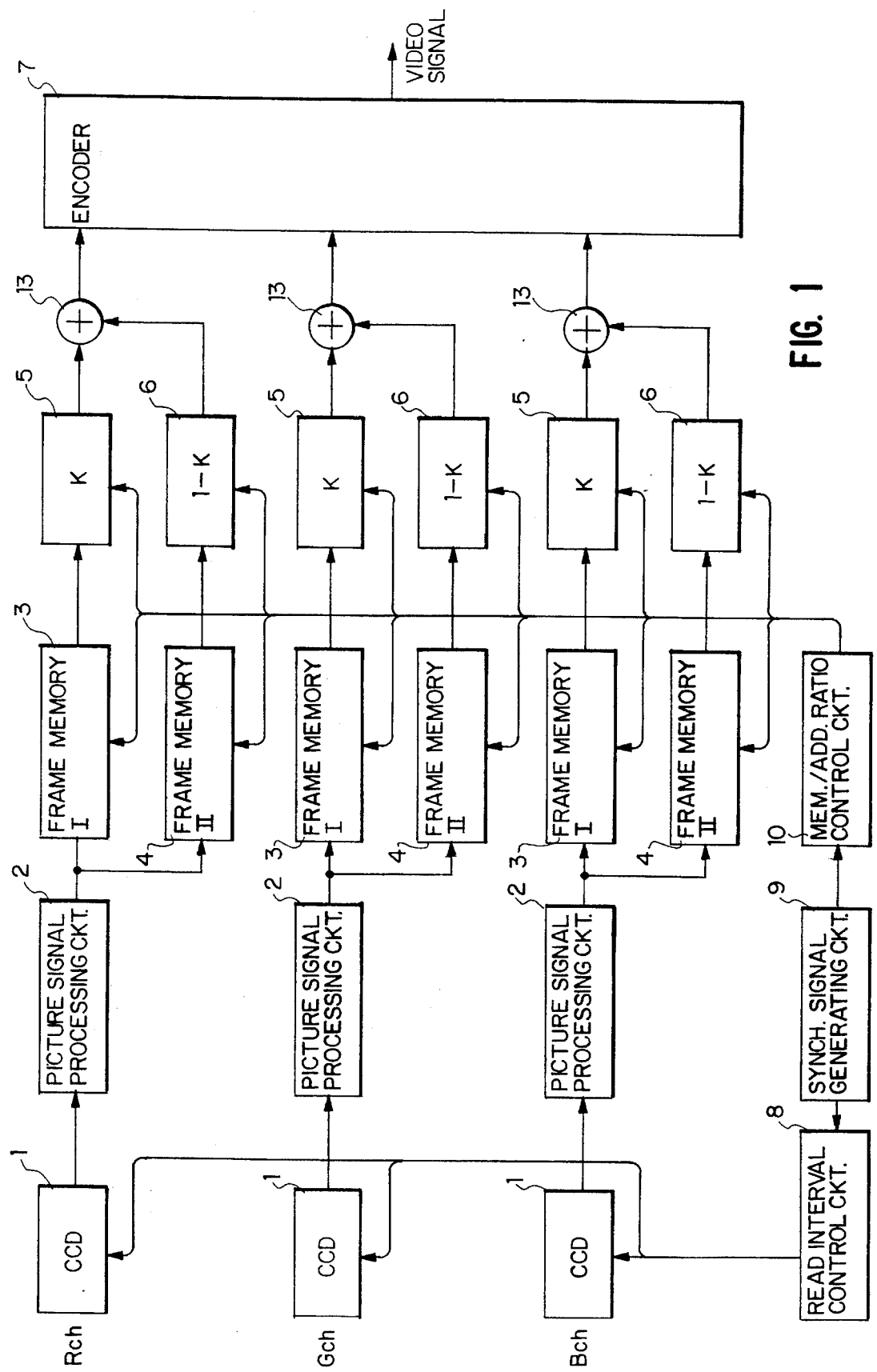
FIG. 1 is a block diagram of an embodiment of the high sensitivity camera device according to the invention.
Figure 3:
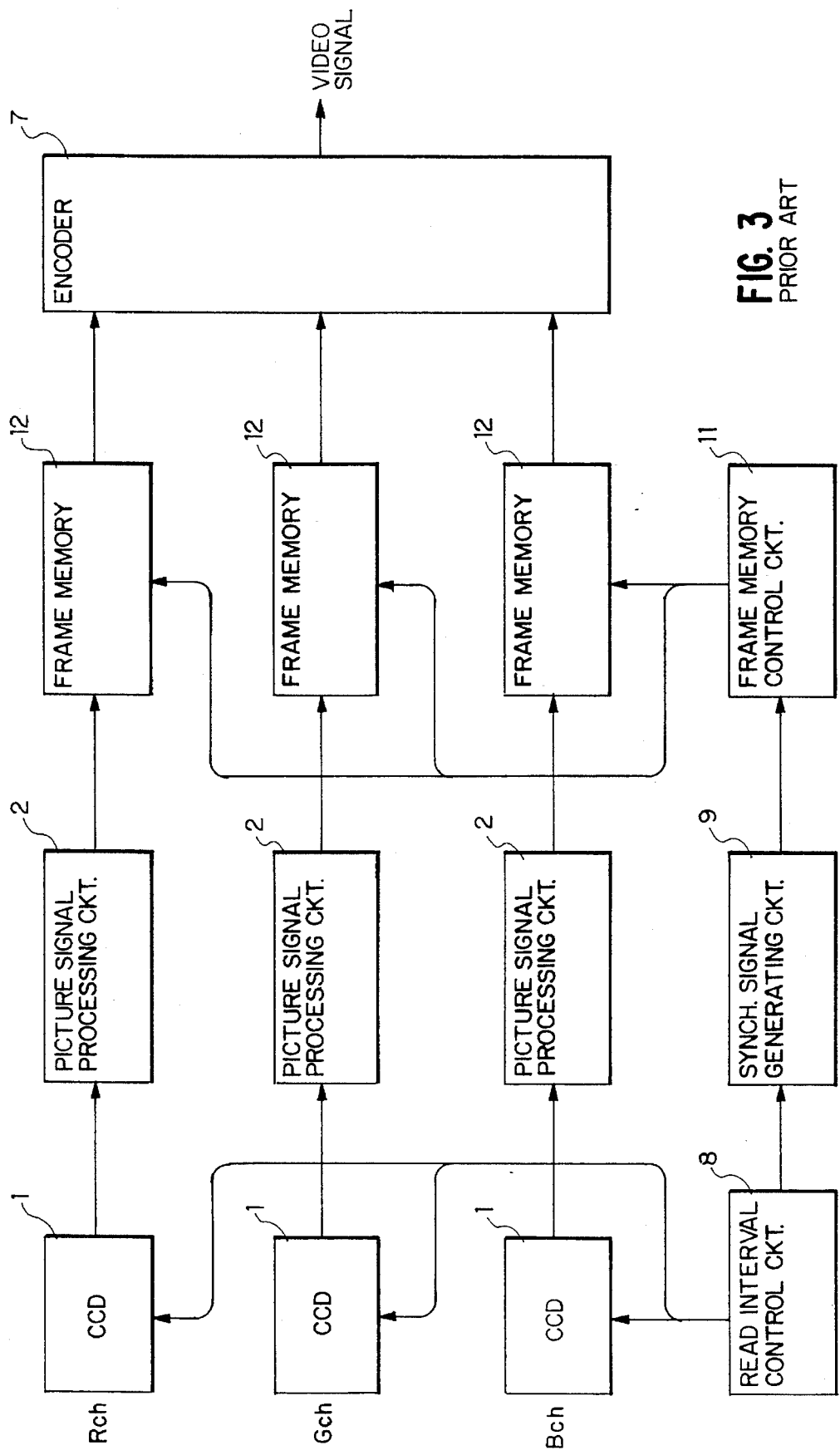
FIG. 3 is a block diagram of a prior art high sensitivity camera device.
Figure 4:
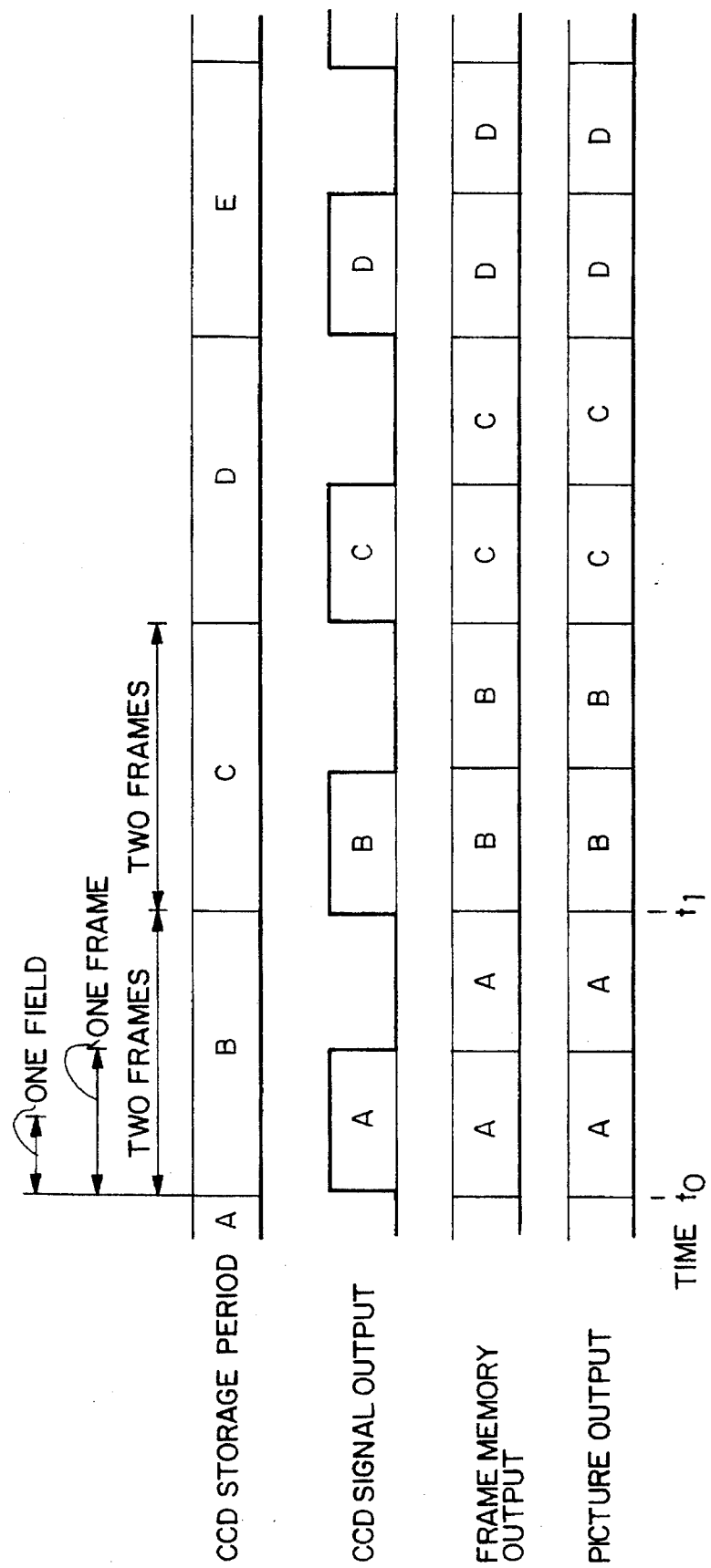
FIG. 4 is a timing chart showing the operation of the prior art in FIG. 3.

Next, referring to the drawings, this invention will be described. An embodiment of this invention shown in FIG. 1 is an example of application of the invention to an RGB three chip type color camera device using CCDs. In the figure, the same reference numerals as in FIG. 3 indicate identical constituents.

In the figure, the difference from the prior art resides in the fact that two frame memories are prepared for the signal system of each color channel, the outputs of these frame memories are added with the ratio of K and (1−K), and the result is sent to an encoder. Explained in more detail, a frame memory (I) 3 and a frame memory (II) 4 alternately store the output of the picture signal processing circuit 2 by means of a write signal sent from a memory addition ratio control circuit 10, and repeatedly output the same pictures for the periods of several frames until the next write signal is delivered. The read interval control circuit 8 is a circuit which controls the time interval of the read pulses for transferring the charge stored in the charge storage part of the CCD 1. The memory addition ratio control circuit 10 performs the write and read control for the frame memory 3 and the frame memory 4 synchronized with the charge read timing. At the same time, the circuit 10 changes the addition ratio of picture signals from the frame memory 3 and the frame memory 4 by varying the coefficients K (K≦1) and (1−K) of the arithmetic circuits 5 and 6. The synchronizing signal generating circuit 9 is a circuit which generates a synchronizing signal necessary for the picture signal processing circuit 2 and a timing signal necessary for the read interval control circuit 8 and the memory addition ratio control circuit 10.

Figure 2:
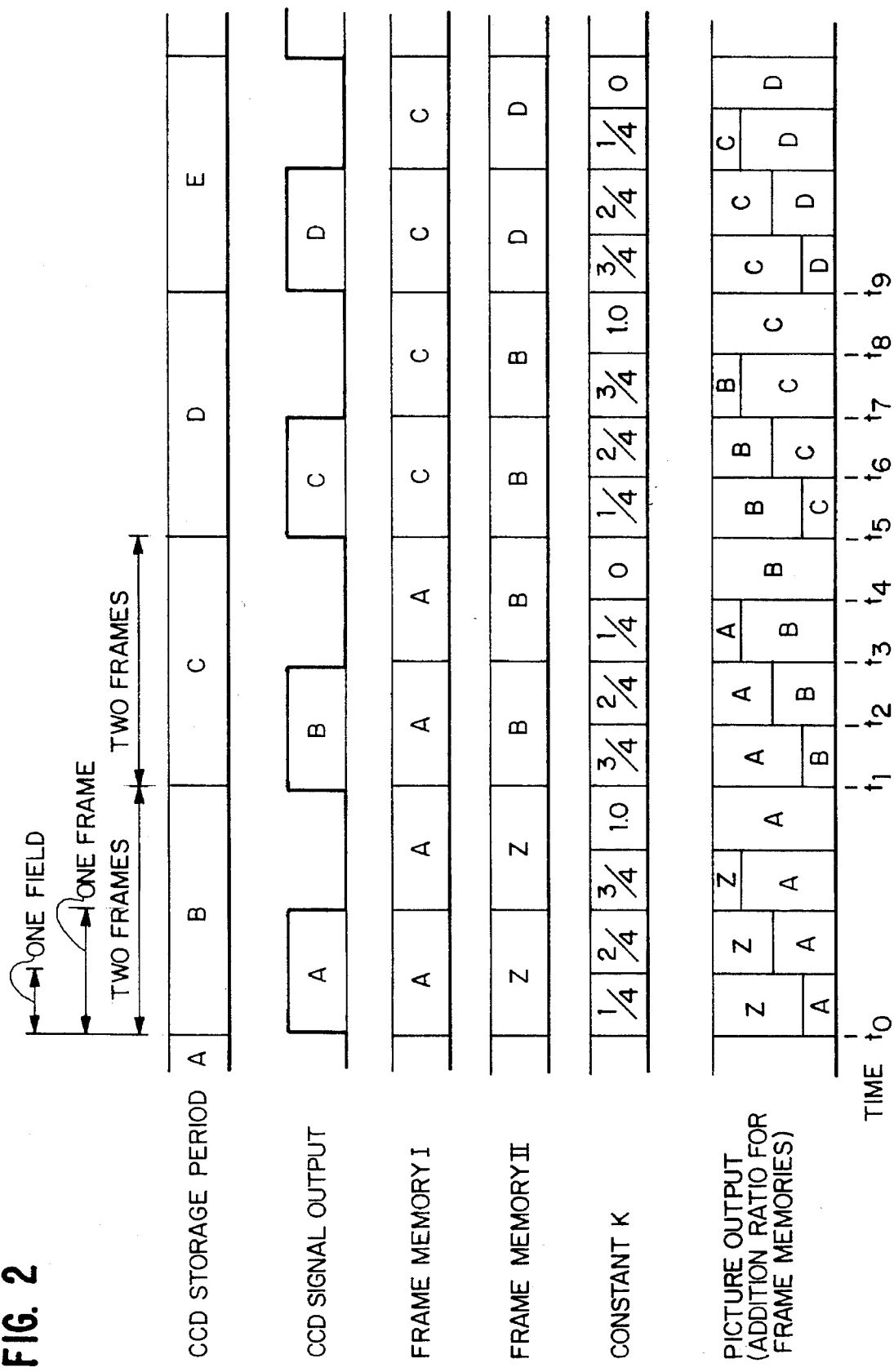
FIG. 2 is a timing chart showing the operation of the embodiment in FIG. 1.

FIG. 2 is a diagram for describing the operation of this invention, which shows an example of storing the signal charge in the CCD 1 over two frame periods. A signal A stored in the charge storage part of the CCD 1 over two frame periods is output at the time $t_0$. The signal A output from the CCD 1 is sent through the picture signal processing circuit 2 and is stored in the frame memory (I) 3. At the time $t_1$ two frame periods later, the next signal B output from the CCD1 is sent through the picture signal processing circuit 2 and is stored in the frame memory (II) 4.

During the times $t_1$ and $t_2$, 75% of picture signal A from the frame memory 3 and 25% of picture signal B from the frame memory 4 are added in an adder 13 by setting the coefficient K of the arithmetic circuit 5 to ¾ (0.75), and the result is output. Next, during the times $t_2$ and $t_3$, picture signal A from the frame memory 3 and picture signal B from the frame memory 4 are added at 50% each by setting the coefficient K to 2/4, and the result is output. Further, during the times $t_3$ and $t_4$, 25% of picture signal A from the frame memory 3 and 75% of picture signal B from the frame memory 4 are added by setting the coefficient K to ¼ (25%), and the result is output. During the times $t_4$ and $t_5$, 100% of picture signal B from the frame memory 4 is output by setting the coefficient K to 0. At the time $t_5$, a signal C is newly output from the CCD 1, and the content of the frame memory 3 is rewritten to signal C from signal A. Thereafter, during the times $t_5$ and $t_9$, the picture signal from the frame memory 3 and the picture signal from the frame memory 4 are added at the ratios of 1:3, 1:1, 3:1 and 1:0, and the result is output, by sequentially changing the coefficient K from ¼ (0.75), 2/4 (0.5), ¾ (0.75) to 1 in the reversed order to that employed for the period from $t_1$ to $t_5$. It is possible to obtain picture signals free from unnatural appearance of motion by repeating, after the time $t_9$, the operations the same as those for the period from $t_1$ to $t_9$.

Although the present embodiment illustrates the case where high sensitivity is attained by storing the signal charge over two frame periods, the case of storing the signal charge over three or more frame periods can also be handled by properly altering the rate of change of the coefficient K. Moreover, only the case of using CCDs as the image pickup elements has been described in the embodiment, but this invention is not limited to that case alone, and is also applicable to a camera device employing the general solid-state image pickup element such as a MOS device or a charge modulation device (CMD), or the general imaging tube such as a Saticon or a Harpicon.

As described in the above, according to this invention, even in the case of realizing high sensitivity by means of charge storage for a period of an integral multiple of one frame or one field, it is possible to obtain a high sensitivity camera device having an output which is free from unnatural appearance of motion of the objects, by using two frame memories and two arithmetic circuits whose addition coefficients during the period can be controlled.

Although the invention has been described with reference to a specific embodiment, this invention is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A high sensitivity camera device comprising:

an image pickup element;

a read interval control circuit for controlling a time interval of reading a signal charge stored in said image pickup element;

two frame memories for alternately recording output signals read from said image pickup element for every period of said time interval; and arithmetic circuits for adding, for every frame, output signals from said two frame memories in a ratio in response to the charge read time interval for said image pickup element.

2. The high sensitivity camera device as claimed in claim 1, wherein the time interval of reading the signal charge is set to be a multiple of a frame or a field period and said ratio is changed for every frame or field.

3. The high sensitivity camera device as claimed in claim 1, wherein the ratios of the addition of the output signals from said two frame memories are K (K≦1) and (1−K), respectively.

4. A high sensitivity camera device characterized in that the device has signal systems of red, green and blue channels wherein each signal system comprises:

an image pickup element;

a read interval control circuit for controlling a time interval of reading a signal charge stored in said image pickup element;

two frame memories for alternately recording output signals read from said image pickup element for every period of said time interval; and arithmetic circuits for adding, for every frame, output signals from said two frame memories in a ratio in response to the charge read time interval for said image pickup element.

5. The high sensitivity camera device as claimed in claim 4, wherein the time interval of reading the signal charge is set to be a multiple of a frame or a field period and said ratio is changed for every frame or field.

6. The high sensitivity camera device as claimed in claim 4, wherein the ratios of the addition of the output signals from said two frame memories are K (K≦1) and (1−K), respectively.

* * * * *